(12) United States Patent
Kumar et al.

(10) Patent No.: US 12,592,011 B2
(45) Date of Patent: Mar. 31, 2026

(54) DIGITAL REPRESENTATION OF INTERTWINED VECTOR OBJECTS

(71) Applicant: Adobe Inc., San Jose, CA (US)

(72) Inventors: Harish Kumar, Noida (IN); Praveen Kumar Dhanuka, Howrah (IN)

(73) Assignee: Adobe Inc., San Jose, CA (US)

( * ) Notice: Subject to any disclaimer, the term of this patent is extended or adjusted under 35 U.S.C. 154(b) by 560 days.

(21) Appl. No.: 18/145,915

(22) Filed: Dec. 23, 2022

(65) Prior Publication Data

US 2024/0212242 A1      Jun. 27, 2024

(51) Int. Cl.
G06T 11/60          (2006.01)

(52) U.S. Cl.
CPC .......... G06T 11/60 (2013.01); G06T 2200/24 (2013.01); G06T 2210/12 (2013.01); G06T 2210/62 (2013.01)

(58) Field of Classification Search
None
See application file for complete search history.

(56) References Cited

U.S. PATENT DOCUMENTS

| | | | |
|---|---|---|---|
| 10,043,233 B1 | 8/2018 | Beri et al. | |
| 10,997,770 B1 | 5/2021 | Kumawat | |
| 12,271,976 B2 | 4/2025 | Kumar et al. | |
| 12,380,617 B2 | 8/2025 | Kumar et al. | |
| 2017/0352171 A1 | 12/2017 | Kumar et al. | |

| | | | |
|---|---|---|---|
| 2018/0315216 A1 | 11/2018 | Beri et al. | |
| 2019/0019333 A1 | 1/2019 | Kumar et al. | |
| 2020/0020139 A1 | 1/2020 | Kumar et al. | |
| 2020/0117347 A1* | 4/2020 | Voliter ................... | G06T 11/40 |
| 2020/0219287 A1 | 7/2020 | Phogat et al. | |
| 2020/0242823 A1* | 7/2020 | Gehlaut ................. | G06T 11/40 |
| 2020/0372695 A1 | 11/2020 | Beri et al. | |
| 2021/0134037 A1 | 5/2021 | Beri et al. | |
| 2021/0333960 A1* | 10/2021 | Beri ...................... | G06F 3/0486 |
| 2022/0180602 A1* | 6/2022 | Hao .................... | G06V 20/647 |
| 2024/0070944 A1 | 2/2024 | Kumar | |
| 2024/0257408 A1 | 8/2024 | Kumar et al. | |

OTHER PUBLICATIONS

Kumar, Harish , et al., "US Application as Filed", U.S. Appl. No. 18/160,483, filed Jan. 27, 2023, 65 pages.
Kumar, Harish , et al., "US Application as Filed", U.S. Appl. No. 17/896,342, filed Aug. 26, 2022, 70 pages.
Sun , et al., "Image Vectorization using Optimized Gradient Meshes", ACM Transactions on Graphics, vol. 26 No. 3 [retrieved Nov. 14, 2022]. Retrieved from the Internet <https://web.archive.org/web/20140804205101id_/http://research.microsoft.com/pubs/69442/imagevectorization_siggraph07.pdf>., Jul. 2007, 7 pages.

(Continued)

*Primary Examiner* — James A Thompson
(74) *Attorney, Agent, or Firm* — FIG. 1 Patents

(57) ABSTRACT

Digital representation techniques of intertwined vector objects are described. These techniques support a non-destructive representation of intertwined digital objects. Additionally, these techniques support editing of overlaps to change a visual ordering in an intuitive and efficient manner. Optimization operations are also implemented that remove redundancy, combine overlaps into a single representation, address visual artifacts at borders between the intertwined objected, and so forth.

20 Claims, 11 Drawing Sheets

(56)     References Cited

OTHER PUBLICATIONS

"Corrected Notice of Allowability", U.S. Appl. No. 17/896,342, filed Jul. 10, 2025, 3 pages.

"Notice of Allowance", U.S. Appl. No. 17/896,342, filed May 27, 2025, 23 pages.

"Non-Final Office Action", U.S. Appl. No. 17/896,342, filed Jan. 3, 2025, 75 pages.

"Corrected Notice of Allowability", U.S. Appl. No. 18/160,483, filed Mar. 12, 2025, 2 pages.

"Non-Final Office Action", U.S. Appl. No. 18/160,483, filed Dec. 27, 2024, 9 pages.

"Notice of Allowance", U.S. Appl. No. 18/160,483, filed Jan. 24, 2025, 5 pages.

Johnson, et al., "Image Generation From Scene Graphs", Proceedings of the IEEE Conference on Computer Vision and Pattern Recognition (CVPR), 2018, pp. 1219-1228, 2018, 10 pages.

* cited by examiner

100

112

122

120

110

Computing Device 102

Image Processing System 104

Intertwined Object Control System 116

108

Vector Objects 118

Digital Image 106

Network 114

200

400

402

416

412

308

410

408

310

414

110

Optimization Module 230

Zone Trimming Operation 406

Figure 5:
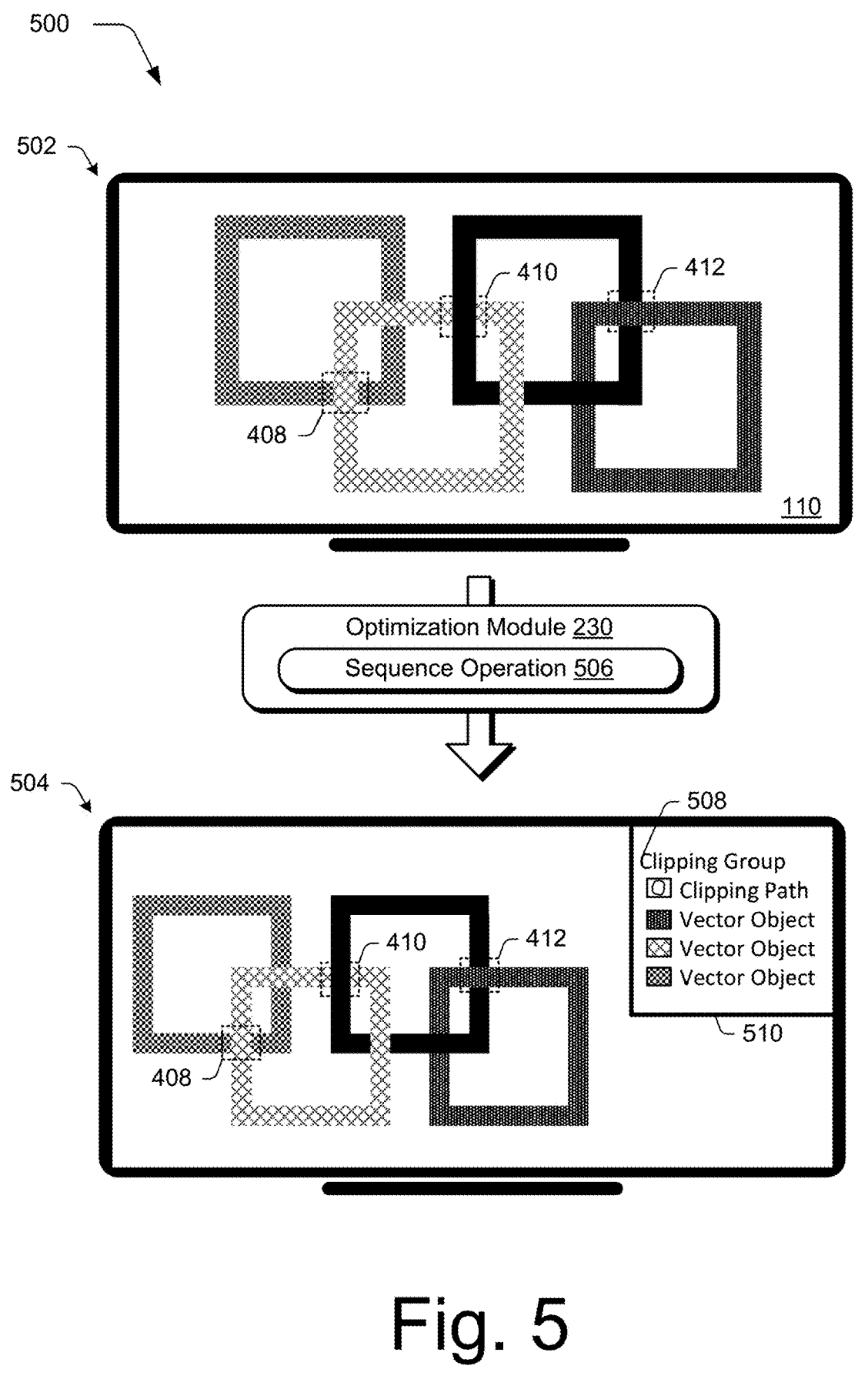

Optimization Module 230

Sequence Operation 506

504

508

Clipping Group
- Clipping Path
- Vector Object
- Vector Object
- Vector Object

670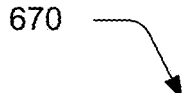

Digital Representation

```
Require: Intertwine Object I
 1:  procedure FILLCHILDMASK(Z, V, Cᵢ)
 2:      End ← Find Cᵢ in V
 3:      L ← ∅
 4:      for i in (0, End) do
 5:          if Vᵢ > Cᵢ or (Vᵢᵗʰ element has transparency) then
 6:              add Vᵢ in L
 7:      m ← Find geometric intersection of Cᵢ element with union of elements in L
 8:      return m
 9:  procedure FILLMASK(I)
10:      for each zone zᵢ in (Z) do
11:          Vᵢ ← V(zᵢ)
12:          for each cⱼ in Vᵢ do
13:              M₍cⱼ,ᵢ₎ ← FILLCHILDMASK(zᵢ,Vⱼ, cⱼ)
         return
14:  procedure FILLZONEMASK(I)
15:      for each zone zᵢ in (Z) do
16:          Vᵢ ← V(zᵢ)
17:          for each cⱼ in Vᵢ do
18:              add cⱼ, M₍cⱼ,ᵢ₎ in ZMᵢ                              ▷ ZM is zone mask
         return
19:  procedure GETFLATTENREPRESENTATION(I)
20:      FILLMASK(I)
21:      FILLZONEMASK(I)
22:      G ← new group object above I
23:      for each iₜₕ element in (I) do
24:          M' ← Bounds(Cᵢ) - Mᵢ
25:          Create a clipping group with Cᵢ element and M' mask
26:      for each zone zᵢ in (Z) do          ▷ In case of transparency, add zone clipping group as well.
27:          Vᵢ ← V(zᵢ)
28:          if any elements in Vᵢ has transparency then
29:              Create empty group Gᵢ element
30:              for each entry in ZMᵢ do
31:                  Create clipping group in Gᵢ with entry.mask as mask, and entry.index as child element
         return
```

Fig. 6C

700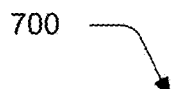

---

Algorithm 1 Non Destructive Representation

---

Require: Intertwine Object $I$

1: procedure GETFLATTENREPRESENTATION($Z$, $I$)                                    ▷ Clip group corresponding to $Z$
2:      $G \leftarrow$ new group object above $I$
3:      $p \leftarrow$ create path object corresponding to $\Omega$
4:      reorder $p$ at the bottom of $G$
5:      $\Sigma \leftarrow$ list of childs in $I$
6:      for each item $i$ in $(V)$ do
7:          $o \leftarrow \Sigma_i$                                                   ▷ $i_{th}$ element in child list of intertwine object
8:          duplicate $o$ at the bottom of $G$
9:      set clip property with $G$
10:     return $G$
11: procedure CREATEIMPLICTZONE($I$)
12:     $\Omega \leftarrow$ visual bounds of $I$
13:     for each $Z_i$ in $\Sigma$ do
14:         $\Omega \leftarrow \Omega - \Omega_i$                                     ▷ Compute intersection surface
15:     $V \leftarrow$ child list of $I$
16:     return $(\Omega, V)$
17: procedure GETFLATTENREPRESENTATION($I$)
18:     $G \leftarrow$ new group object above $I$
19:     for each zone $z_i$ in $(Z)$ do
20:         $g_i \leftarrow$ GETFLATTENREPRESENTATION($z_i$, $I$)
21:         Reorder $g_i$ at the bottom of $G$
22:     $Z_{implicit} \leftarrow$ CREATEIMPLICTZONE($I$)
23:     $g_{imp} \leftarrow$ GETFLATTENREPRESENTATION($Z_{implicit}$, $I$)
24:     Reorder $g_{imp}$ at the bottom of $G$
25:

DIGITAL REPRESENTATION OF INTERTWINED VECTOR OBJECTS

BACKGROUND

Digital images are configurable to include a variety of different objects that are renderable for display by a display device, printing by a printer, and so forth. In a first example, objects are configurable as raster objects (e.g., bitmaps) that are defined on a per-pixel basis to represent the object. Raster objects are typically configured for display at a particular resolution (e.g., zoom level) and therefore changing this resolution often introduces errors, visual artifacts, and so forth.

Vector objects have been developed to address these issues as being implemented as a mathematical representation used to define the object which support scaling through a multitude of resolutions without introducing errors. However, in some scenarios conventional techniques used to edit the vector object destroy the underlying representation and therefore this functionality is lost. This makes vector objects that are subject to the edit susceptible to visual artifacts and inaccuracies, and hinder computing device operation that implement these techniques.

SUMMARY

Digital representation techniques of intertwined vector objects are described. These techniques support a non-destructive representation of intertwined digital objects. Additionally, these techniques support editing of overlaps to change a visual ordering in an intuitive and efficient manner. Optimization operations are also implemented that remove redundancy (and thus reduce file size), combine overlaps into a single representation, address visual artifacts at borders between the intertwined objected (e.g., cause by anti-aliasing techniques), and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 depicts an example implementation of an intertwined vector object optimization involving a zone trimming operation.

FIG. 5 depicts an example implementation of an intertwined vector object optimization involving a sequence operation.

FIG. 6C depicts an example algorithm describing operation of the shared pixel operation of FIGS. 6A and 6B.

FIG. 7 depicts an example algorithm describing operation of a system of FIG. 2.

DETAILED DESCRIPTION

Overview

Figure 1:
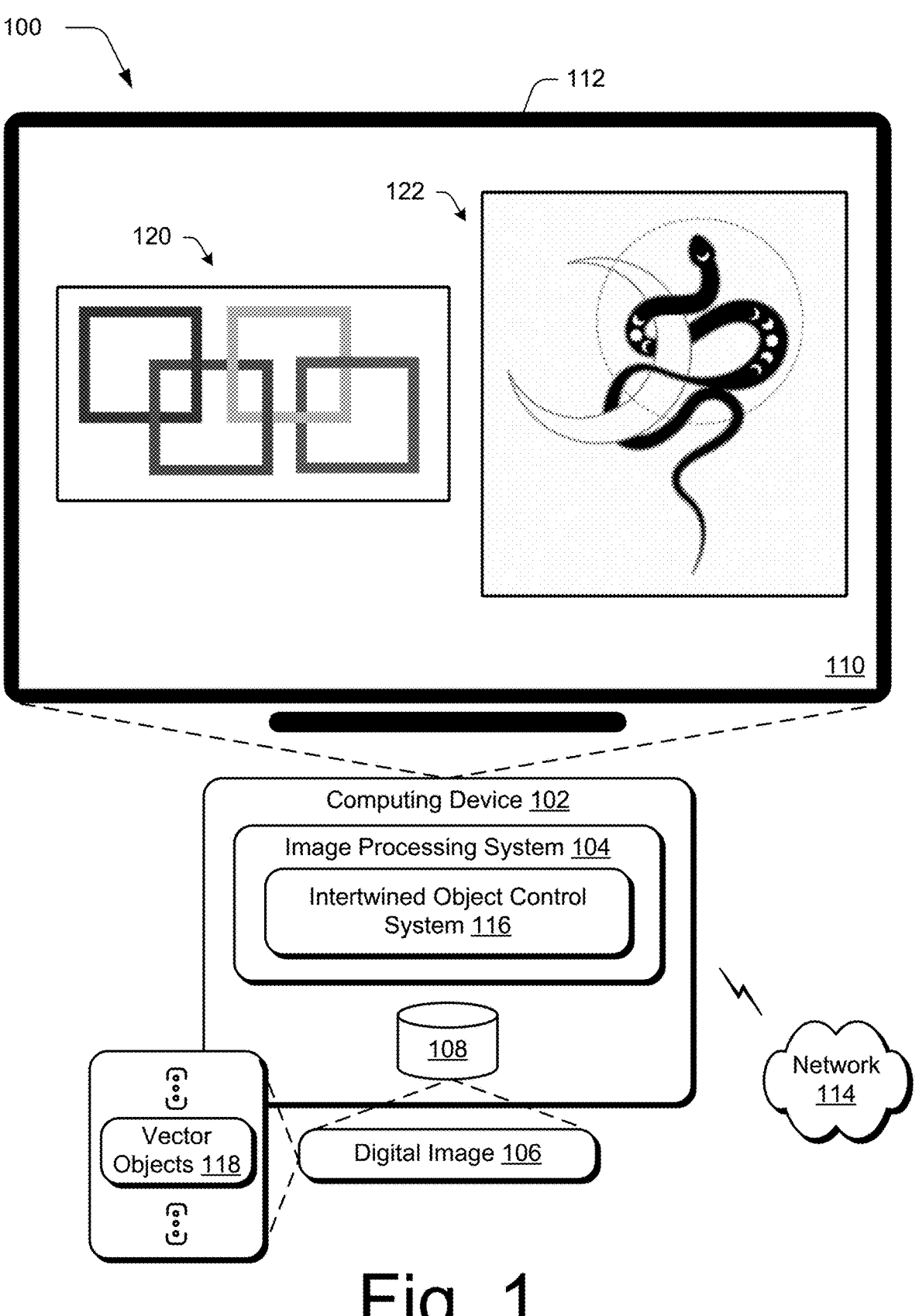
FIG. 1 is an illustration of a digital medium environment in an example implementation that is operable to employ digital representation techniques of intertwined vector objects as described herein.

Vector objects have been developed to expand functionality that is not available via other types of objects, e.g., raster objects. In some scenarios, however, techniques used to edit the vector object "break" an underlying mathematical definition of the vector object, a result of which the object is then susceptible to challenges of these other types of objects, e.g., scaling, aliasing, and so forth.

An example of this involves intertwined objects. Intertwined objects involve a connection between the objects that are twined together such that the objects overlap and/or intersect through each other, often multiple times in a Z-direction. Examples of this include chain links, the Olympic® rings, and so forth. Conventional techniques to support intertwining using vector objects, however, involve destructive representations in which an underlying definition of the vector objects is lost, use of meshes that are challenged when used for complex objects, limit continued editing, and so forth.

Accordingly, digital representation techniques of intertwined vector objects are described. These techniques support a non-destructive representation of intertwined digital objects. Additionally, these techniques support editing of overlaps to change a visual ordering in an intuitive and efficient manner. Optimization operations are also implemented that remove redundancy (and thus reduce file size), combine overlaps into a single representation, address visual artifacts at borders between the intertwined objected (e.g., cause by anti-aliasing techniques), and so forth.

In an example, a digital image is displayed in a user interface. An input is received that identifies a zone within the digital image. A user input, for instance, is received via a user interface as circling a portion of the digital image. The user input is detected as a path and a boundary of the path is determined, e.g., which mimics the path, as a bounding box, and so forth. This is usable, for instance, in a scenario in which the digital image includes a plurality of vector objects and the user wishes to change an overlap of vector objects within the particular zone.

An intertwined object control system, for instance, detects the zone based on the user input, automatically based on detect vector object overlaps, and so forth. A clipping group is then generated based on the zone. Clipping is a technique used as part of digital image rendering to selectively enable and disable rendering operations with respect to the digital image. This is used in this example to define what is rendered within the zone.

The intertwined object control system, for instance, generates the clipping group by generating a mask based on the zone, which defines what is to be rendered inside the zone, e.g., where pixels are to be rendered and not rendered with respect to rendering of the digital image. The intertwined object control system also identifies which of the plurality of vector objects are least partially included within the zone. A visual ordering (e.g., Z-ordering) of the identified vector objects within the zone is determined. The vector objects identified as within the zone are copied for inclusion as part of a clipping group along with the mask and the visual ordering.

The clipping group is then used as a basis to control rendering within the zone as well as a visual order of the virtual objects within the zone in a nondestructive manner. In an example, the clipping group is displayed in a user interface. This includes representations of the respective vector objects, e.g., by shape, color, pattern, etc. The representations are further configurable to indicate the visual ordering, e.g., are displayed in an order according to a visual ordering of the vector objects. This display is configurable to include a representation of the zone (e.g., the path) used to define the zone, and so forth.

These representations support user interaction via the user interface to edit the clipping group. This includes changes to the visual ordering and as such supports an ability to define which of the vector objects overlap other vector objects within the zone. This is usable for a plurality of clipping groups within the digital image, each usable to define different visual orderings of the vector objects within respective zones. In this way, the intertwined object control system is usable to control how vector objects are intertwined in a nondestructive manner within the digital image.

The intertwined object control system is also configured to support a variety of optimizations that improve rendering and operation of computing devices that implement these techniques. This includes analysis optimizations including a trim operation to trim a size of the zones (to reduce data storage size), sequence operations (e.g., to combine zones based on visual ordering consistency), redundancy removal by utilized a vector object in support of multiple instances, a shared pixel operation (e.g., to reduce visual artifacts caused by anti-aliasing techniques at borders between vector objects), and so forth. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital representation techniques of intertwined vector objects as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 9.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the digital image 106 is illustrated as an intertwined object control system 116. This system is configured to control visual ordering of vector object 118 within the digital image 106.

Intertwined vector objects involve a connection between the objects that are twined together such that the objects overlap and/or intersect through each other, often multiple times in a Z-direction. In a first example 120, interlocking squares are shown in which each vector object is displayed as overlapping and intersecting another vector object at one location and underlying the same vector object at another location. In a second example 122, a snake is intertwined with a moon such that the snake appears both above and below the moon at different locations.

Conventional techniques used to support intertwining of vector objects, however, involve destructive representations in which an underlying definition of the vector objects is lost, use of meshes that are challenged when used for complex objects, limit continued editing, and so forth. In a conventional raster example, a vector object is converted into a raster object and then edited. As such, this destroys an underlying mathematical representation and thus is prone to artifacts at different zoom levels and the object is no longer editable using vector object techniques.

In a conventional mesh-based representation technique, the intertwined representation is represented using triangle meshes for an entirety of the intertwined objects, and texture is then mapped onto the triangle meshes. In instances involving different colors or noticeable color differences inside a triangle, the triangle is further subdivided. However, this technique is challenged with complex objects and other constructs that are not readily supported by meshes, such as gradients, knockout groups, transparency, and so forth. Further, editability remains a challenge and is not consumable as part of a Scalable Vector Graphics (SVG) format.

In the techniques described herein, however, digital representations of intertwined vector objects are supported through use of clipping groups that are non-destructive, support continued editing, and avoid visual artifacts of conventional techniques used to configure intertwined digital objects. Further discussion of these and a variety of examples are included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Intertwined Vector Object Control Techniques

Figure 8:
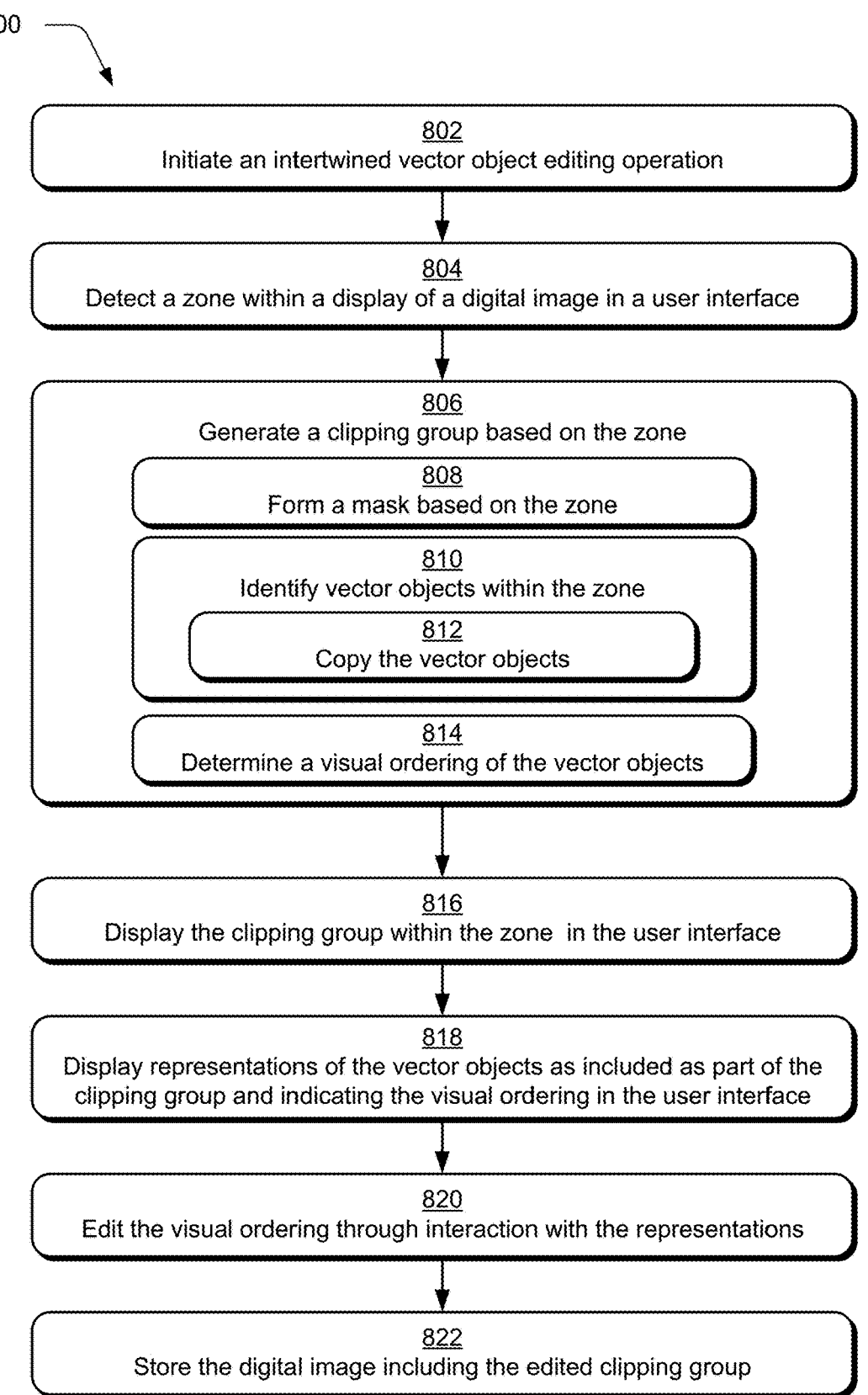
FIG. 8 is a flow diagram depicting a procedure in an example implementation of digital representation of intertwined vector objects.

The following discussion describes techniques that are implementable utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-7 in parallel with an example procedure 800 of FIG. 8 and first, second, and third stages 302, 304, 306 of an example implementation 300 of FIG. 3.

Figure 2:
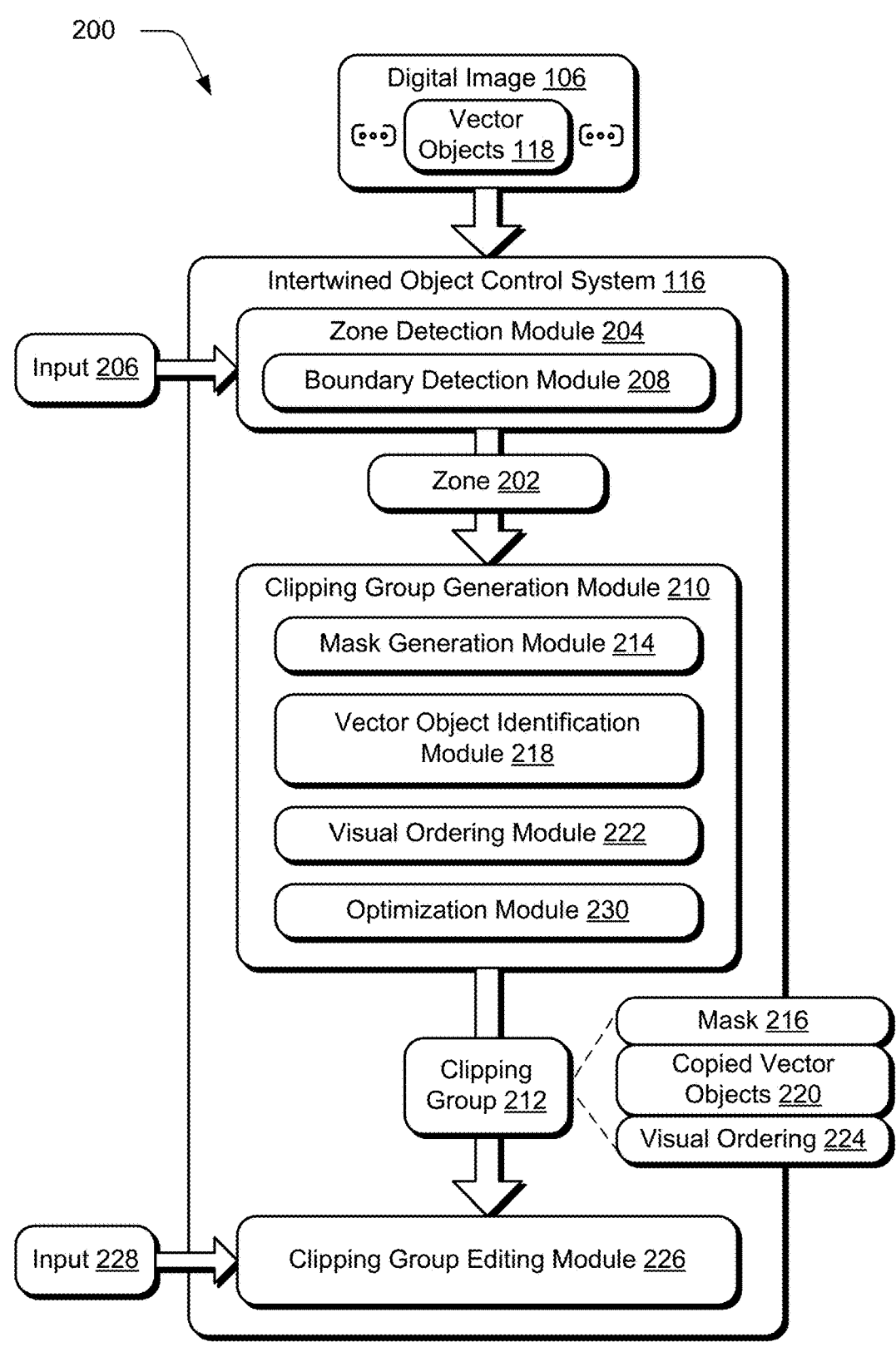
FIG. 2 depicts a system in an example implementation showing operation of an intertwined object control system of FIG. 1 in greater detail.

FIG. 2 depicts a system 200 in an example implementation showing operation of the intertwined object control system 116 of FIG. 1 in greater detail. To begin in this example, an intertwined vector object editing operation is initiated (block 802), e.g., via selection in a menu, via receipt of a user input indicating a zone, and so forth. The user interface 110, for instance, receives an input via selection of a representation of the intertwined vector object editing operation from a menu, e.g., "right click" menu, selection from a menu bar, and so forth.

As part of the intertwined vector object editing operation, a zone 202 is detected within a display of a digital image 106 in a user interface 110 (block 804) by a zone detection module 204. This may be performed automatically and without user intervention by detecting overlaps of the vector objects 118 within the digital image 106. In another example as illustrated at a first stage 302 of FIG. 3, an input 206 is received via the user interface 110 as a freeform line defining a path (e.g., via a cursor control device, gesture, and so forth) within a display of the digital image 106. A boundary detection module 208 then detects a boundary based on the input, e.g., as a path (e.g., using one or more Bezier curves), a bounding box defined based on extremes in the input 206 in X and Y coordinates, and so forth.

A clipping group generation module 210 is then employed to generate a clipping group 212 based on the zone 202 (block 806). To do so, a mask generation module 214 is utilized to generate a mask 216 based on the zone (block 808). As previously described, a mask 216 defines what is to be rendered with respect to the zone 202, e.g., where pixels are to be rendered and not rendered with respect to rendering of the digital image 106. In this example of the first stage 302 of FIG. 3, the mask 216 defines a portion to be rendered within an interior of the path defined by the input 206 and that portions not within that interior are not to be rendered. This is usable to specify multiple locations that are continuous, not continuous (e.g., drawn as brush strokes), and so forth.

A vector object identification module 218 is also employed by the clipping group generation module 210 to identify vector objects within the digital image 106 as being included at least partially within the zone 202 (block 810). The vector object identification module 218, for instance, detects which of the vector object 118 intersect the zone 202. Once identified, the vector object identification module 218 copies those vector objects 118 (block 812) forming copied vector objects 220 for inclusion as part of the clipping group 212.

A visual ordering module 222 is also leveraged to determine a visual ordering 224 of the identified vector objects (i.e., the copied vector objects 220) within the zone 202 (block 814). The visual ordering, for instance, defines a Z-ordering and thus overlaps of the copied vector objects 220 within the zone 202. In this way, the clipping group generation module 210 generates the clipping group 212 to include the mask 216, the copied vector objects 220, and the visual ordering 224. Thus, the copied vector objects 220 are included in this example in addition to vector objects 118 of the digital image 106.

The clipping group 212 is rendered and displayed within the zone 202 in the user interface 110 along with the digital image 106 (block 816). Accordingly, the clipping group 212 is used to define what is displayed within the zone 202 as part of the digital image 106. Therefore, changes may be made within the zone with affecting other parts of the digital image 106 "outside" of the zone 202.

Figure 3:
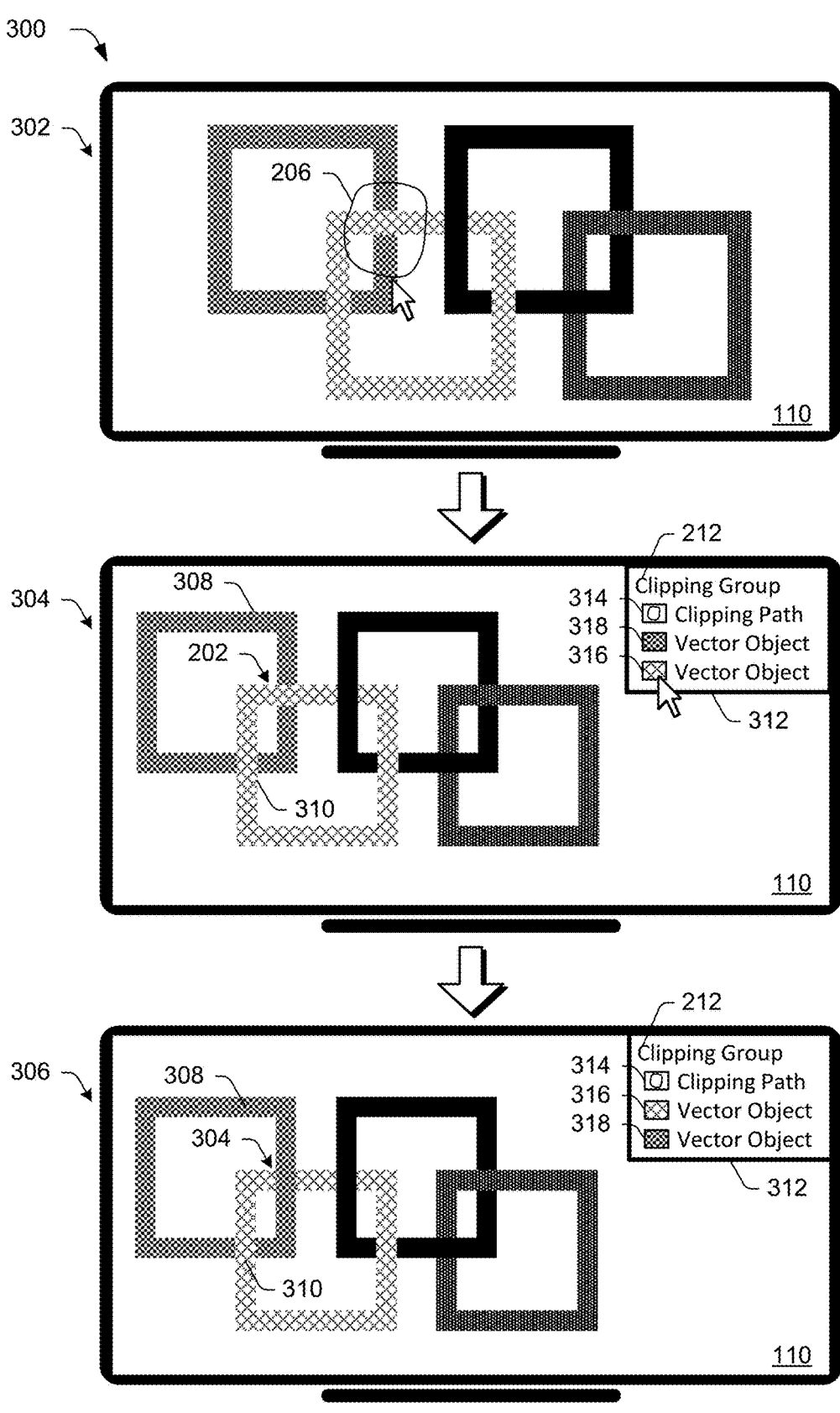
FIG. 3 depicts an example implementation of editing a visual order of vector objects within a clipping group.

As shown at a second stage 304 of FIG. 3, the user interface 110 includes a first vector object 308 and a second vector object 310 that intersect a zone 202. The intertwined object control system 116, in response to receipt of the input 206 at the first stage 302, generates the clipping group 212 using a clipping group generation module 210. The clipping group 212 is displayed in a user interface 110 through use of a clipping group editing module 226 as part of a menu 312.

The menu 312 in the illustrated example is used to display representations of the vector objects as included as part of the clipping group and indicating the visual ordering in the user interface (block 818). The menu 312, for instance, includes a representation 314 of a shape of a path (i.e., the input 206) that defines the zone 202. The clipping group 212 also includes a first representation 316 of the first vector object 308 and a second representation 318 of the second vector object 310. In this example, the menu 312 indicates a top/down visual ordering 224 of the vector objects, in which the second representation 318 is displayed before and above the first representation 316. A variety of other examples are also contemplated, including nesting of the representations, a tree-structure, overlaps, and so forth.

The visual ordering is then edited through interaction with the representations (block 820) via the user interface 110 and the clipping group editing module 226. An input 228, for instance, is received that positions the first representation 316 of the first vector object 308 in order before the second representation 318 of the second vector object 310. This edit causes the first vector object 308 to be displayed above the second vector object 310 in the user interface 110 as shown at the third stage 306. This is in contrast to the visual ordering of the first and second vector objects 308, 310 as shown at the second stage 304. The digital image including the edited clipping group (block 822) is then storable as part of the digital image 106, such that the copied vector objects

220 are used to control what is displayed within the confines of the mask 216 and the other (original) vector objects 118 are used for rendering outside the confines of the mask 216.

FIG. 7 depicts an example algorithm 700 describing operation of the system 200 of FIG. 2. In this algorithm, there are "n" zones of intertwined objects, each of which are mutually exclusive, and have a single visual order, as expressed in the following equation:

$$Z = (\Omega, V) \mid \Omega i \cap \Omega j = \emptyset, |V| = 1$$

As each zone is spatially mutually exclusive, a clipping group is created for each zone "(z)" with elements being the vector objects corresponding to visual order of zone "Vz." At the end, an implicit zone is created which is difference of boundaries of each of the zones with a visual boundary of each of the other zones, and visual order is same as order of object elements in layer panel.

$$\Omega_{implicit} \cup \left( \sum_{i=1}^{K} \Omega_j \right) = \Omega_I$$

The techniques described herein support lossless conversion into vector primitives. After converting into basic primitives, using the techniques described herein, vector objects are not degenerated into different shapes unlike conventional degenerative-vector representation techniques.

The intertwined object control system 116 is also configured to support additional optimizations that improve operation and reduce visual artifacts, functionality of which is represented by an optimization module 230 of FIG. 2.

Consider a scenario involving "K" zones and each zone has "N" objects in a corresponding visual order. Conversion into primitives, in a "worst case" scenario involves creating "K·N" duplicate objects as compared to "N" objects in original intertwine groups. Accordingly, the optimization module 230 is configured to address this by minimizing both "K" and "N" to improve computational efficiency of primitive conversion of intertwine, examples of which are described as follows.

Figure 4:
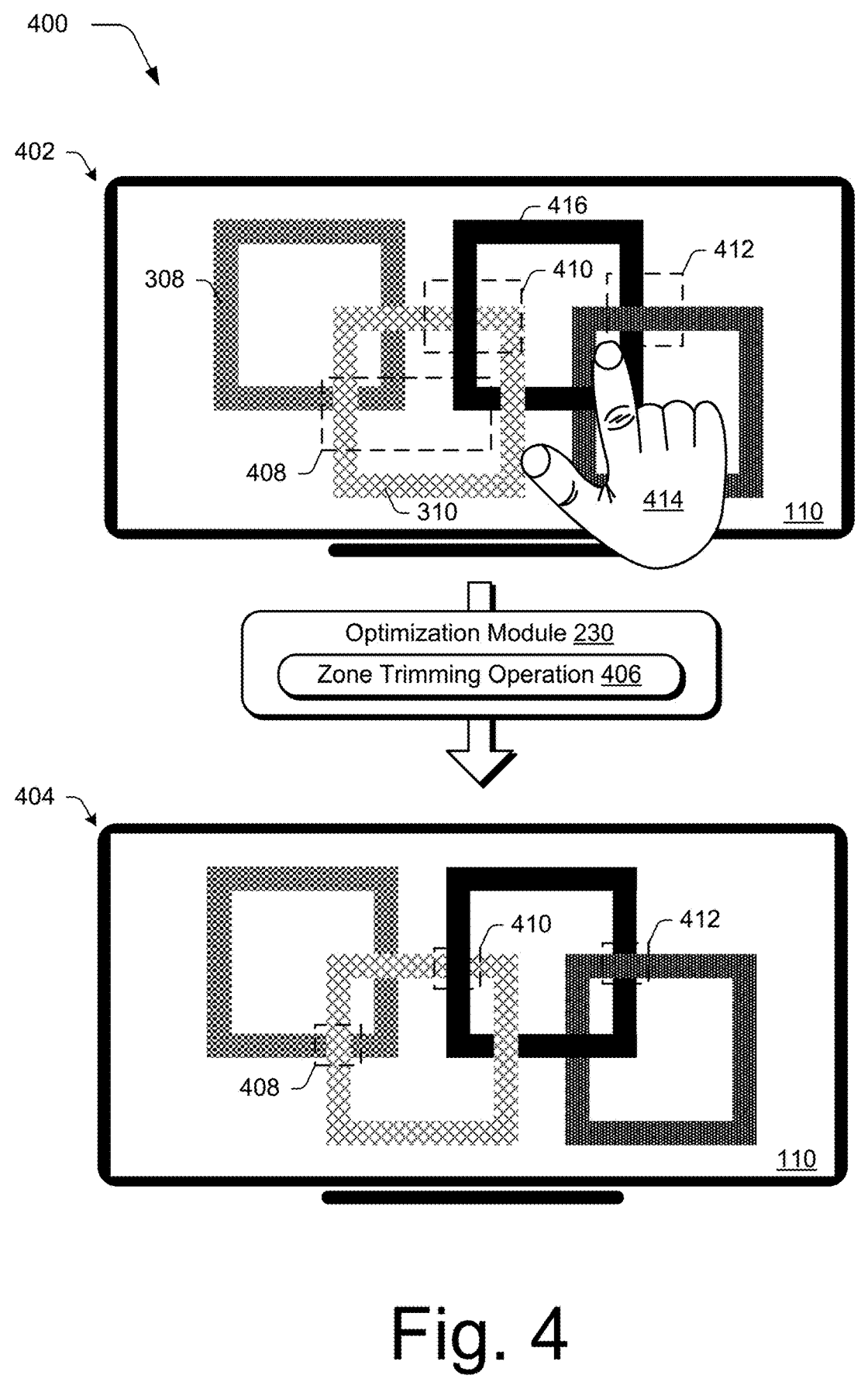

FIG. 4 depicts an example implementation 400 of an intertwined vector object optimization involving a zone trimming operation. This implementation 400 is illustrated using a first stage 402 and a second stage 404. In this example, a zone trimming operation 406 is utilized to minimize a number of vector object within a zone.

As shown at the first stage 402, inputs are received that are used to indicate a first zone 408, a second zone 410, and a third zone 412 (e.g., via a user input 414) in the user interface 110. A zone trimming operation 406 is utilized in this example to reduce a number of vector objects included within a zone. In some instances, a boundary "Σ" for a zone "Z" covers additional vector objects, e.g., the first zone 408 includes a first vector object 308 and a second vector object 310 that are intertwined and a third vector object 416 that is not intertwined with first vector object 308.

In order to change a visual order of "V" of "Z" in a ternary mode "[V $\oplus$ ($A_{key}$, Ai, D)]," a key object is given as an input, e.g., as identifying first vector object 308. Therefore, vector objects that intersect with the key object "$A_{key}$" (i.e., first vector object 308) are to be processed. To do so, the zone trimming operation 406 is used to trim boundary "Σ" for "Z" as follows:

$$\Omega_Z = (\Omega_Z \cup \Omega_{Akey})$$

As the boundary is localized to the vector objects inside it, each other vector object that does not overlap "$A_{key}$" gets discarded. As the area of "$\Sigma_Z$" is reduced, a number of objects which lies inside "N" also asymptotically reduces.

As shown at the second stage 404, the first zone 408 is minimized to include first vector object 308 and second vector object 310 but not the third vector object 416. Additionally, an overall size of the zones is reduced, thereby conserving memory resources.

FIG. 5 depicts an example implementation 500 of an intertwined vector object optimization involving a sequence operation. This implementation 500 is illustrated using a first stage 502 and a second stage 504. In the previous example, an operation was described to reduce a number of objects "N" within a zone. In this example, a sequence operation 506 is utilized to reduce an overall number of zones. There are a variety of ways in which the sequence operation 506 is executable to perform this.

In an "original sequence" scenario, if a visual order "$V_Z$" for any zone "Z" follows an increasing order of sequence, this means the visual order of that zone is same as visual order of implicit zone "$V_{Zimplicit}$." This indicates there is no change in ordering compared to the visual ordering (e.g., "Z-ordering") of child members of an intertwine group.

$$V_{poset} = (x_1, x_2 \ldots x_N) \mid \forall \ i, \ j(x_i < x_j)$$

A "non-conflicting sequence" involves instances in which two or more zones having a nonconflicting visual order. In that case, boundaries of two zones are merged by the sequence operation 506 into a single zone. Mathematical representation is given as follows for non-conflicting as follows:

$$V_{toseti} = V_{tosetj} \Rightarrow Zi \bigcirc Zj$$

If "$V_{toset}$" for any zone "$Z_i$" is same as that of "$Z_j$" then the zones are nonconflicting. The sequence operation 506 supports one-to-many mapping from "$V_{poset}$" to "$V_{toset}$" for any zone "Z." This holds true for equivalent "$V_{toset}$" of two zones that are matching.

As shown at a first stage 502, for instance, continuing with the example of FIG. 4, a first zone 408, a second zone 410, and a third zone 412 are specified in the user interface 110. The sequence operation 506 determines these zones have visual orderings that are consistent with each other, i.e., do not conflict. Hence, boundaries of these zones are merged by the sequence operation 506 into a single zone without impacting an in-variance property of the zone. As a result, as shown at the second stage 504 these zones are included withing a single clipping group 508 that includes representations of the vector objects in a menu 510 that is usable as before to edit the visual ordering of the vector objects.

In another example, the optimization module 230 is configured to remove redundancy. Continuing with the above examples, even after reducing the number of zones and number of elements, some vector objects are still duplicated in some scenarios multiple times. Accordingly, the optimization module 230 is configured to employ multiple instances from a single vector object. For instance, the optimization module 230 is configurable to create symbol vector objects for each component vector objects inside an intertwine group, and instead of duplicating the vector objects again, another instance of that symbol vector object is created. Each of the instances share a transformation matrix, which reduces an amount of time taken and processing resources utilized in duplicating vector objects.

Figure 6A:
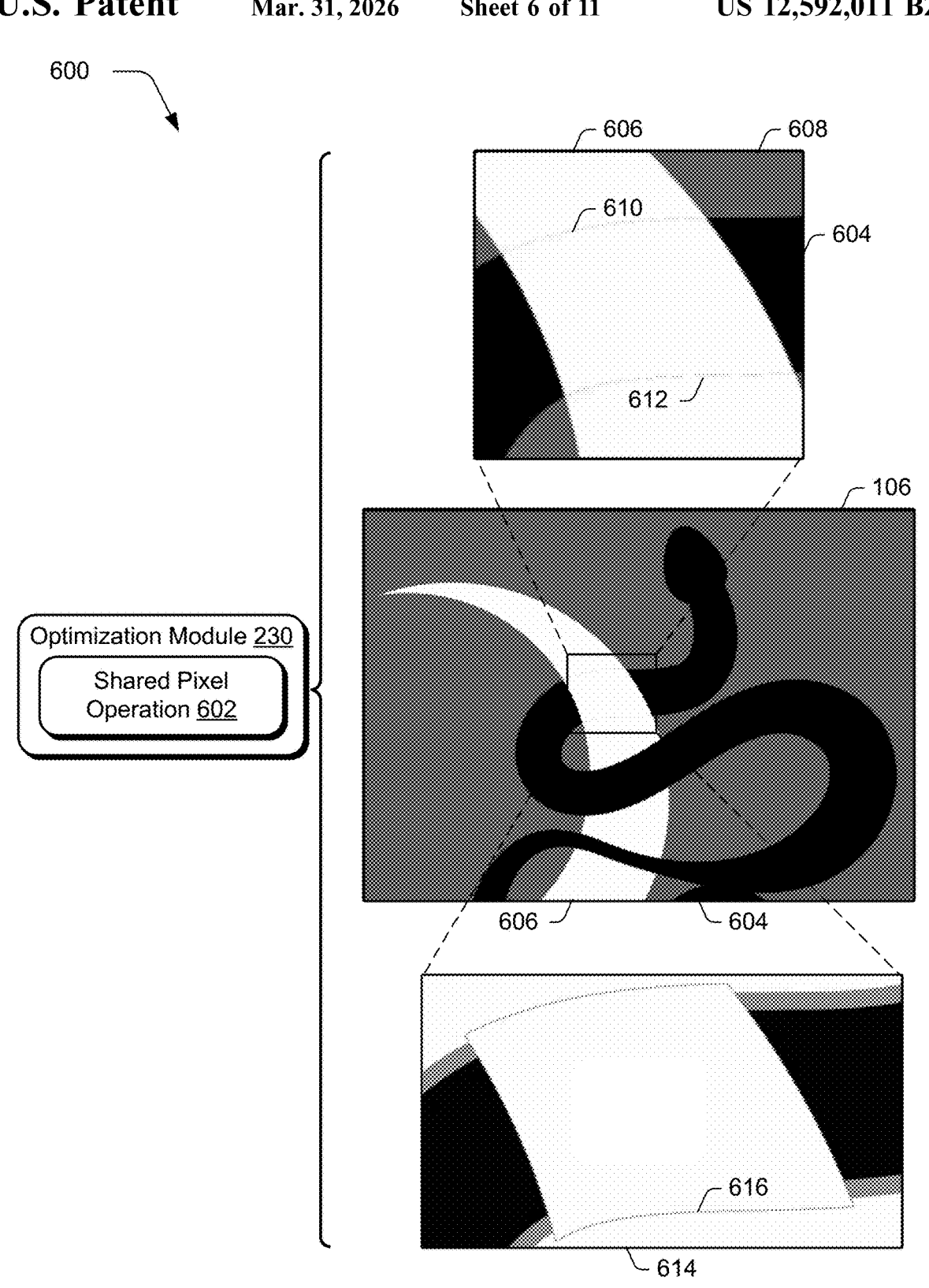
FIG. 6A depicts an example implementation of an intertwined vector object optimization involving a shared pixel operation.

FIG. 6A depicts an example implementation 600 of an intertwined vector object optimization involving a shared pixel operation 602. In this example, the shared pixel operation 602 is utilized to reduce visual artifacts at a border between first and second vector objects 604, 606 in the digital image 106.

This example implementation 600 includes an expanded view 608. As illustrated, visual artifacts 610, 612 may occur at borders between the first and second vector objects 604, 606. This is often caused by antialiasing techniques in which a border of the underlying first vector object 604 "bleeds through" to impact a visual appearance of the second vector object 606. The shared pixel operation 602 is configurable to address this in a variety of ways based on detecting shared borders within a zone to be used to define a clipping group, e.g., for an overlap.

In a first example, the shared pixel operation 602 is configured to "turn off" antialiasing for when the clipping group is rendered within a zone. However, in some instances this functionality is not supported as part of rendering.

Accordingly, in a second example the shared pixel operation 602 is configured as shown in a second expanded view 614 to hide vector objects within the clipping group that have changed with respect to a visual ordering "outside" of the zone defining the clipping group. This is performed in this example using a clipping mask 616 based on a visual order such that the vector object having the changed visual order is "hidden" beneath a vector object disposed over that object, e.g., the first vector object.

To create the clipping mask 616, an intersecting area is identified between the vector objects within the zone. The intersecting area defines a portion of the vector object that is to be "hidden" as beneath one or more other vector objects, e.g., the snake as beneath the moon in the illustrated example.

The intersecting area is then inflated, e.g., by 0.5 pixels, thereby creating an offset area. Intersection of the offset area is then computed with respect to other vector objects in the zone, i.e., are part of the clipping group. Pixels of the offset area that intersect other vector objects are removed from the offset area, while those that do not intersect remain are included with the portion of the vector object to create the clipping mask 616. In the illustrated clipping mask 616, this is illustrated as an offset expanding up and down past an original border of the portion of the vector object while remaining the same at portions that intersect other objects, e.g., the intersection of the snake and the moon. The clipping mask 616 is then included as part of the clipping group 212 for that zone such that the portion of a respective object (e.g., the snake) is hidden from affecting other objects in the clipping group when rendered, e.g., so that antialiasing is not encountered along the offset area of the clipping mask due to lack of overlap at a border of the objects.

Figure 6B:
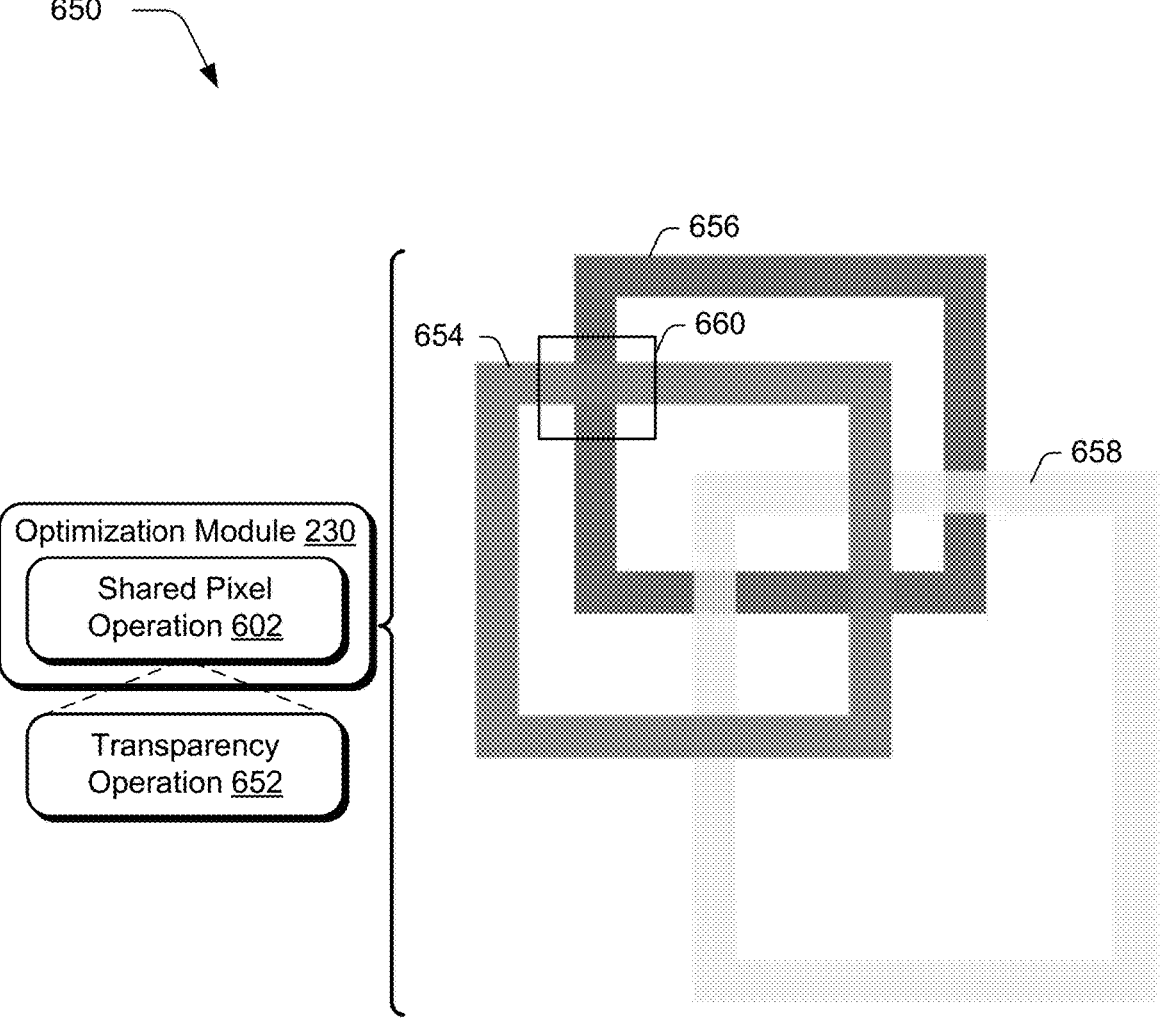
FIG. 6B depicts an example implementation of an intertwined vector object optimization involving the shared pixel operation of FIG. 6A as addressing transparency functionality through use of a transparency operation.

However, scenarios may occur in which the vector objects within a zone employ transparency functionality such that portions of underlying vector objects are viewable through overlying vector objects. Accordingly, to address this FIG. 6B depicts an example implementation 650 in which the shared pixel operation 602 employs a transparency operation 652. The transparency operation 652 is configured to support use of different amounts of transparency by respective vector objects within a clipping group.

This example is depicted as including a first vector object 654, a second vector object 656, and a third vector object 658. A zone 660 defining a clipping group is also depicted that includes an overlap of the first vector object 654 in a visual ordering as disposed over the second vector object 656.

The optimization module 230, and more particularly the shared pixel operation 602, detects that the vector objects in this clipping group employ transparency functionality. Accordingly, this example continues from the previous example in which a clipping mask is generated, including an offset area, such that the portion of the second vector object 656 is hidden beneath the first vector object 654.

Because one or more of these vector objects employ transparency, the transparency operation 652 is utilized to generate corresponding portions of the vector objects to "fill back in" the clipping mask based on the transparency. To do so, the clipping mask is used to render the vector objects according to the visual ordering and amounts of transparency within the clipping mask. The second visual object 656 and then the first visual object 654 are rendered in this example as following the visual ordering having corresponding amounts of transparency and are masked using the clipping mask as computed with respect to FIG. 6A.

These vector objects and the clipping mask are included as part of the clipping group for that zone 660 such that the objects are rendered as visually consistent with the transparency functionality. FIG. 6C depicts an example algorithm 670 describing operation of the shared pixel operation of FIGS. 6A and 6B. In this example, the child mask is the clipping mask which is filled based on a visual order and included as part of a clipping group. A variety of other examples are also contemplated. In this way, the intertwined object control system 116 supports nondestructive techniques to represent intertwine of vector objects. Further, these techniques support optimizations including reduced redundancy of vector objects, reduction in zone size, and so forth.

Example System and Device

Figure 9:
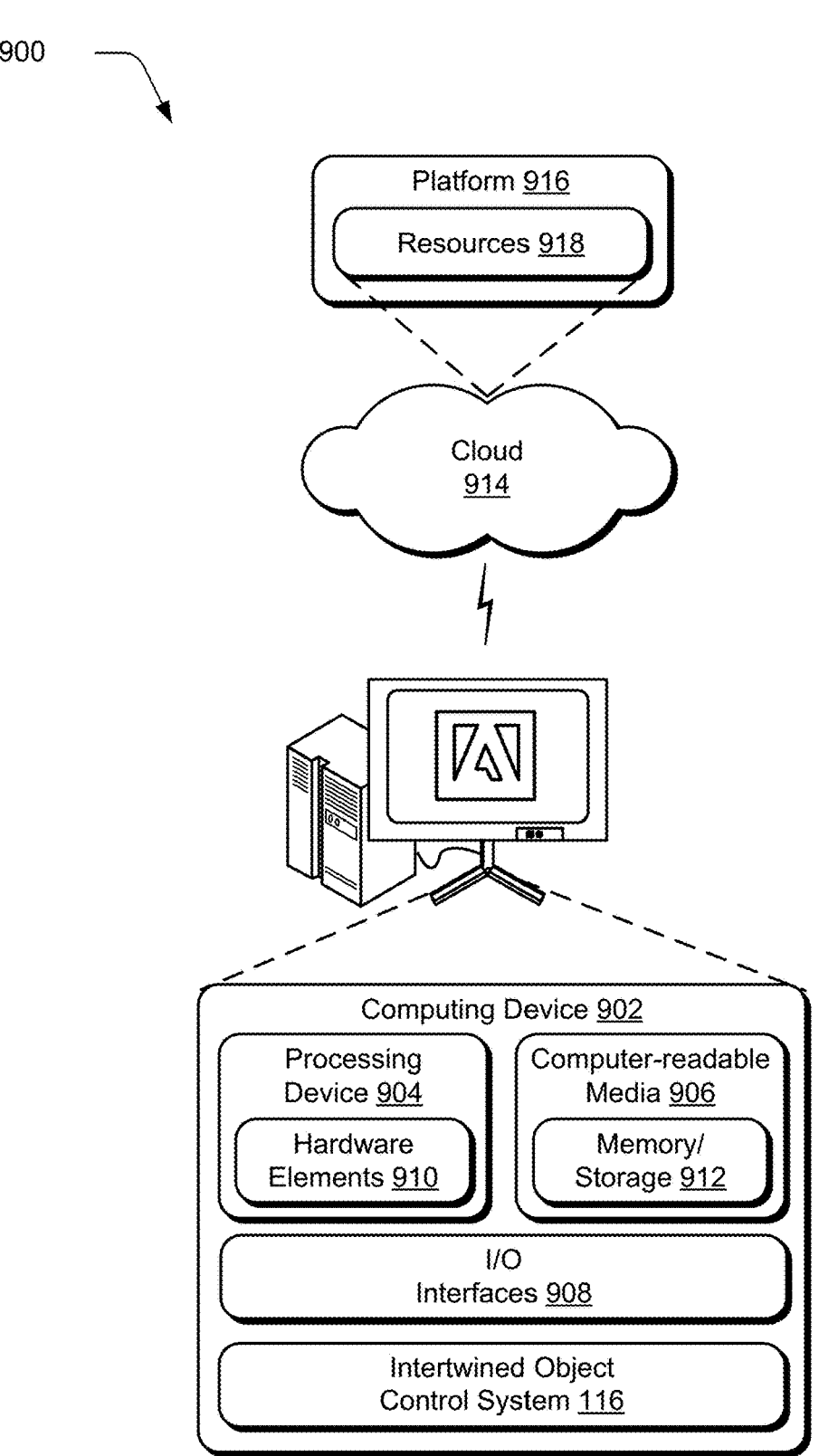
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that implement the various techniques described herein. This is illustrated through inclusion of the intertwined object control system 116. The computing device 902 is configurable, for example, as a server of a service provider, a device associated with a client (e.g., a client device), an on-chip system, and/or any other suitable computing device or computing system.

The example computing device 902 as illustrated includes a processing device 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 904 is representative of functionality to perform one or more operations using hardware. Accordingly, the processing device 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912 that stores instructions that are executable to cause the processing device 904 to perform operations. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing device 904. The instructions and/or functions are executable/operable by one or more articles of manufacture (for example, one or more computing devices 902 and/or processing devices 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

In implementations, the platform 916 employs a "machine-learning model" that is configured to implement the techniques described herein. A machine-learning model refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a processing device, the method comprising:

detecting, by the processing device, a zone within a display of a digital image in a user interface;

generating, by the processing device, a clipping group based on the zone, the generating including:

forming a mask based on the zone;

identifying vector objects within the digital image as being included at least partially within the zone; and determining a visual ordering of the identified vector objects within the zone; and displaying, by the processing device, the clipping group including representations of the identified vector objects within the zone as displayed in the user interface along with the digital image, the representations included within the clipping group selectable to change the visual ordering of the identified vector objects within the zone.

2. The method as described in claim 1, wherein the detecting including detecting a boundary of a user input received via the user interface.

3. The method as described in claim 1, wherein the generating includes copying the vector objects from the digital image for inclusion as part of the clipping group.

4. The method as described in claim 3, wherein the displaying the clipping group includes rendering the copied vector objects as masked based on the mask in the user interface for display in the user interface within the zone.

5. The method as described in claim 3, further comprising storing the copied vector objects, the mask, and the visual ordering of the clipping group as part of the digital image.

6. The method as described in claim 1, wherein the generating the clipping group includes a zone trimming operation configured to reduce a number of vector objects included within the zone.

7. The method as described in claim 1, wherein the generating the clipping group includes a sequence operation configured to combine at least two said zones based on determining that the at least two said zones include respective said visual orderings that do not conflict.

8. The method as described in claim 1, wherein the generating the clipping group includes a redundancy removal operation in which a single instance of a respective said digital object is utilized by a plurality of said clipping groups.

9. The method as described in claim 1, wherein the generating the clipping group includes a boundary pixel operation that is operable to expand a size of the vector objects based on overlaps defined by the visual ordering.

10. The method as described in claim 1, wherein the displaying further includes displaying a representation of a shape of an input as received via the user interface as indicating the zone.

11. A system comprising:

a zone detection module implemented by a processing device to detect a zone within a display of digital image in a user interface;

a clipping group generation module implemented by the processing device to generate a clipping group based on the zone, the clipping group generation module including:

a mask generation module to form a mask based on the zone;

a vector object identification module to copy vector objects identified as included at least partially within the zone; and a visual ordering module to determine a visual ordering of the identified clipping group vector objects within the zone; and a clip group editing module implemented by the processing device to display the clipping group as being editable via the user interface to change the visual ordering of the vector objects within the zone as displayed in the user interface.

12. The system as described in claim 11, wherein the clip group editing module is configured to store the copied vector objects, the mask, and the visual ordering of the clipping group as part of the digital image.

13. The system as described in claim 11, wherein the generating the clipping group includes a zone trimming operation configured to reduce a number of vector objects included within the zone.

14. The system as described in claim 11, wherein the clipping group generation module is configured to include a sequence operation configured to combine at least two said zones based on determining that the at least two said zones includes respective said visual orderings that do not conflict.

15. The system as described in claim 11, wherein the clipping group generation module is configured to include a redundancy removal operation in which a single instance of a respective said digital object is utilized by a plurality of said clipping groups.

16. A system comprising:

a processing device; and a computer-readable storage medium storing instructions that, responsive to execution by the processing device, causes the processing device to perform operations including:

detecting a zone within a display of a digital image in a user interface;

generating a clipping group based on the zone, the generating including:

identifying vector objects within the digital image as being included at least partially within the zone; and determining a visual ordering of the identified vector objects within the zone; and displaying the clipping group including representations of the identified vector objects within the zone as displayed in the user interface along with the digital image, the representations included within the clipping group selectable to change the visual ordering of the identified vector objects within the zone.

17. The system as described in claim 16, wherein the detecting including detecting a boundary of a user input received via the user interface.

18. The system as described in claim 16, wherein the generating includes copying the vector objects from the digital image for inclusion as part of the clipping group.

19. The system as described in claim 18, wherein the displaying the clipping group includes rendering the copied vector objects as masked based on the mask in the user interface for display in the user interface within the zone.

20. The system as described in claim 18, further comprising storing the copied vector objects, a mask of the zone, and the visual ordering of the clipping group as part of the digital image.

* * * * *